United States Patent [19]

Kapke et al.

[11] Patent Number: 4,990,034
[45] Date of Patent: Feb. 5, 1991

[54] METHOD AND APPARATUS FOR FACILITATING FORMATION OF MOVING CYLINDRICAL ARTICLES INTO SINGLE FILE

[75] Inventors: Milton W. Kapke, Golden; Richard H. VanderMeer, Loveland, both of Colo.

[73] Assignee: Goldco Industries, Inc., Loveland, Colo.

[21] Appl. No.: 256,733

[22] Filed: Oct. 12, 1988

[51] Int. Cl.⁵ ............................................. B65G 51/03
[52] U.S. Cl. ................................ 406/88; 406/86; 406/95
[58] Field of Search ............................... 406/86–88, 406/73, 70, 76, 79, 93–95, 82, 181, 117, 157, 159; 198/453, 456, 493

[56] References Cited

U.S. PATENT DOCUMENTS

| | | | |
|---|---|---|---|
| Re. 32,684 | 5/1988 | Lenhart | 406/88 X |
| 3,109,529 | 11/1963 | Carter | 198/453 X |
| 3,117,665 | 1/1964 | Nekola et al. | 198/453 |
| 3,176,821 | 4/1965 | Eldred et al. | 198/453 X |
| 3,561,626 | 2/1971 | Sprague | 198/453 X |
| 3,604,551 | 9/1971 | Fink | 198/453 X |
| 3,795,303 | 3/1974 | Taggart et al. | 198/456 |
| 3,866,739 | 2/1975 | Sikorski | 198/453 |
| 4,096,683 | 6/1978 | McMickle, Jr. | 198/453 X |
| 4,105,398 | 8/1978 | Disch et al. | 198/453 X |
| 4,253,783 | 3/1981 | Lenhart | 406/86 |
| 4,500,229 | 2/1985 | Cole et al. | 406/88 |
| 4,544,059 | 10/1985 | Mernoe | 198/453 |
| 4,561,806 | 12/1985 | Lenhart | 406/88 |
| 4,653,964 | 3/1987 | Lenhart | 406/86 |
| 4,708,234 | 11/1987 | Born et al. | 198/453 |
| 4,730,956 | 3/1988 | Lenhart | 406/86 X |

FOREIGN PATENT DOCUMENTS

| | | | |
|---|---|---|---|
| 215422 | 9/1987 | Japan | 198/453 |
| 171710 | 7/1988 | Japan | 198/453 |
| 8602533 | 5/1988 | Netherlands | 198/453 |

Primary Examiner—Joseph F. Peters, Jr.
Assistant Examiner—James M. Kannofsky
Attorney, Agent, or Firm—Robert E. Harris

[57] ABSTRACT

Method and apparatus are disclosed for facilitating formation of moving cylindrical articles, such as thin walled cans, into single file. The apparatus includes a plurality of diverting arms within a single filing area formed between two plate members having apertures formed therein so that air expelled through the apertures causes movement of conveyed articles not then in single file toward a peripheral guide member and movement of articles then in single file adjacent to the guide member in a direction through the single lining area substantially parallel to the guide member. The spaced diverting arms are pivotably mounted on a mounting plate and biased so that the article engaging portions of the arms are successively engagable with articles not then in single file adjacent to the guide member to thereby yieldably urge such articles into single file with the mounting plate also having apertures therein through which air is expelled to additionally urge the articles toward single file, and with those articles, not in single file when passing the arm positioned to last engage articles not then in single file, being ejected.

28 Claims, 3 Drawing Sheets

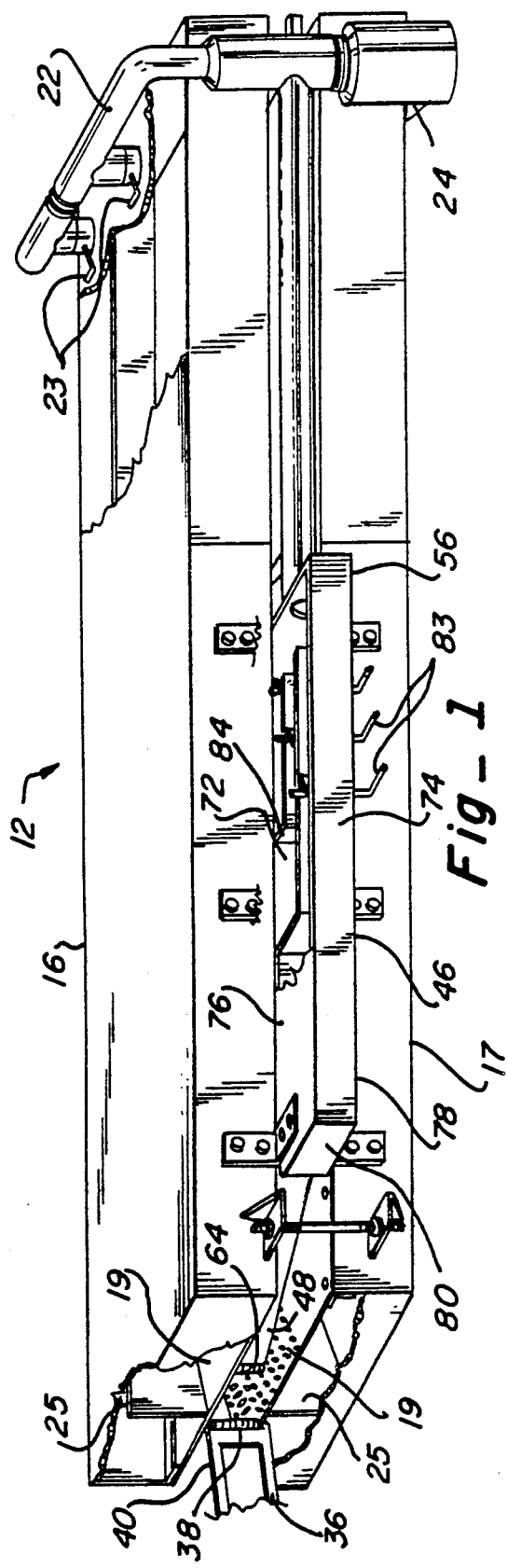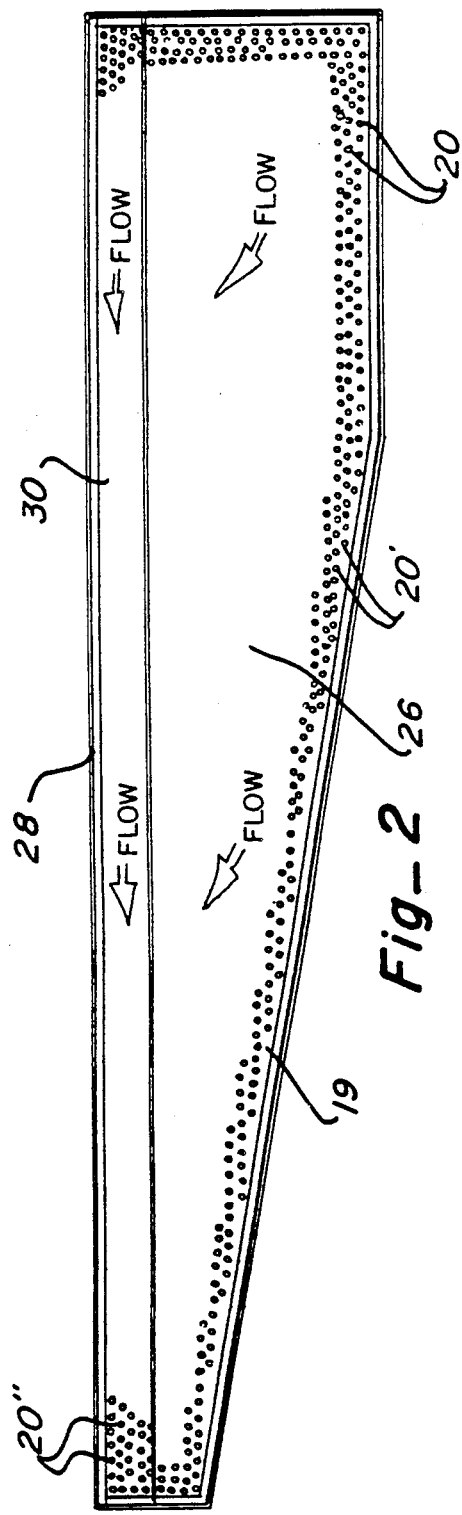

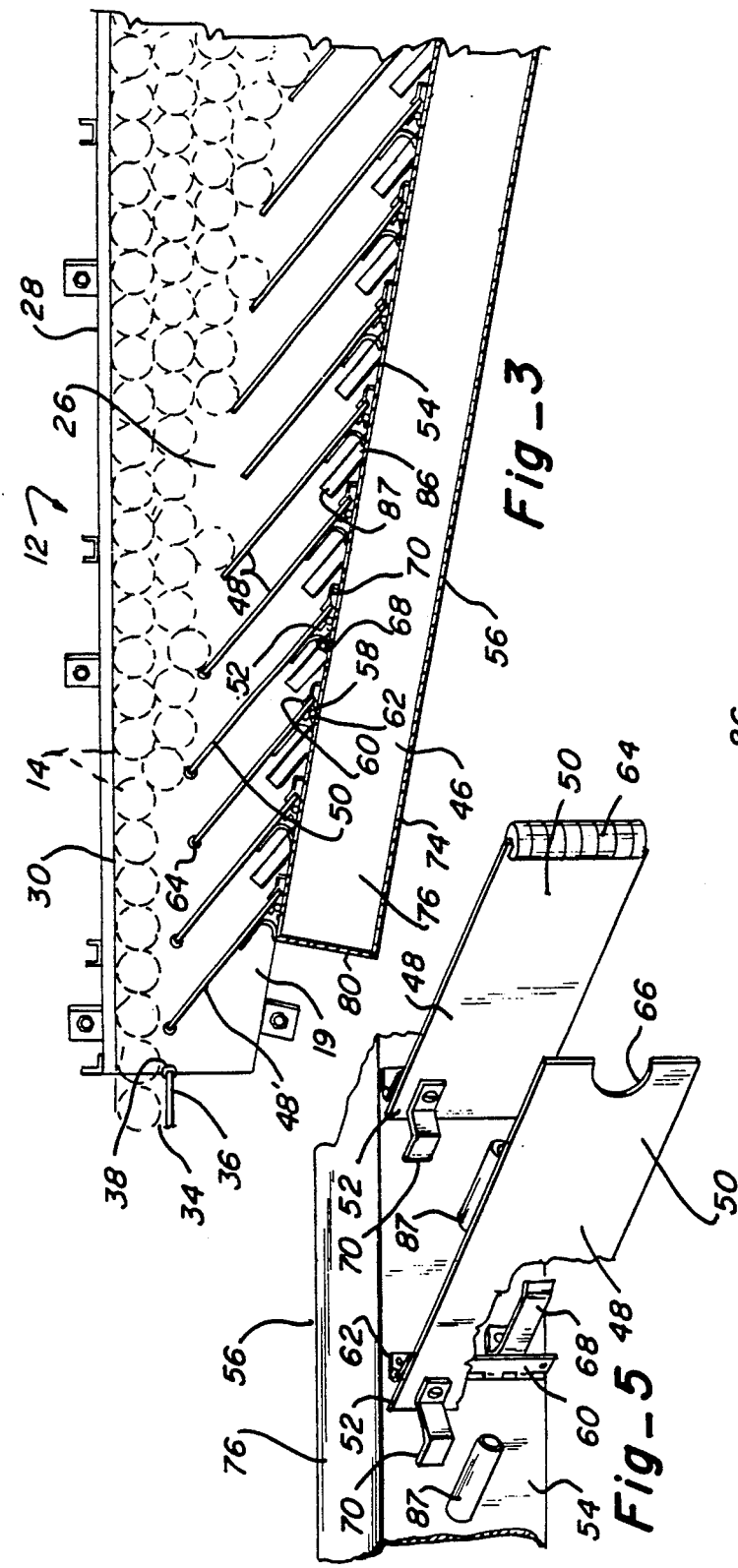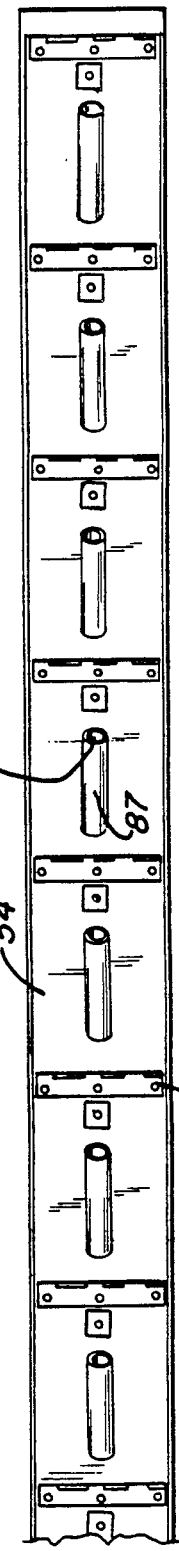

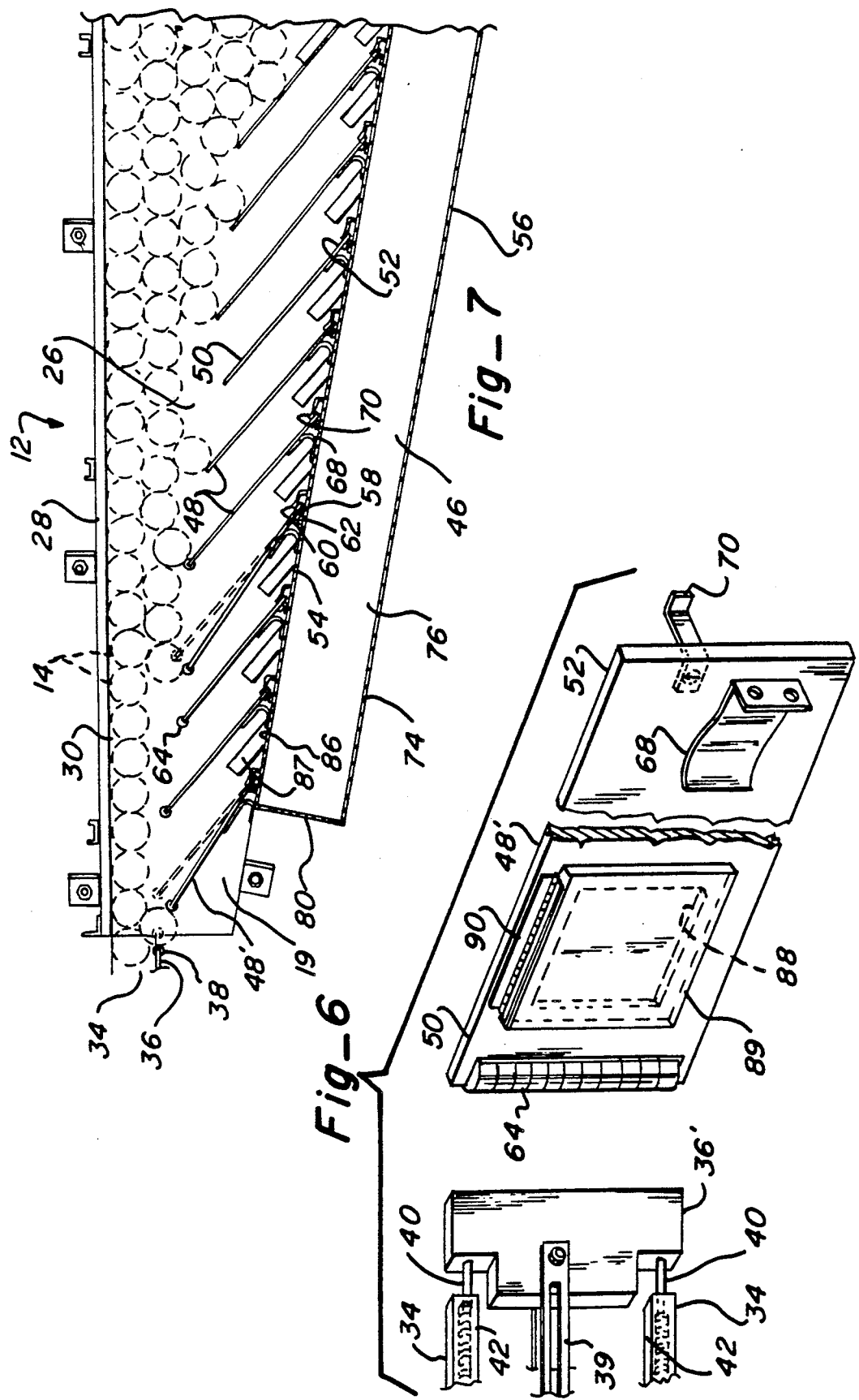

METHOD AND APPARATUS FOR FACILITATING FORMATION OF MOVING CYLINDRICAL ARTICLES INTO SINGLE FILE

FIELD OF THE INVENTION

This invention relates to article handling, and, more particularly, relates to apparatus and method for facilitating formation of moving cylindrical articles into single file.

BACKGROUND OF THE INVENTION

It is often necessary that articles, such as cylindrical articles, be moved, or conveyed, at high flow rates in order to accommodate various operations, such as, for example, those utilizing mass production machinery, and this, at least in part, has made it necessary that such articles be processed in a highly automated fashion. This has been found to be particularly the case, for example, for production or processing of thin walled cans for the containment of food or beverages where it has commonly been found to be necessary to carefully inspect each can for imperfections, either functional or structural, as well as to print and/or otherwise perform operations upon each can after formation.

As a result, it has been found to be often convenient to mass convey articles using broad belts or other conveying means capable of concurrently conveying the articles randomly or possibly in transverse rows. However, for a number of required processing operations, such as inspecting and/or treating, for example, of such articles, it has been found necessary that the articles be single lined, or filed, in order that the articles are thereafter moved in a single file arrangement so that each may be sequentially presented to the various operations.

A typical example of known single lining, or filing, devices is to be found in U.S. Pat. No. 4,500,229, issued Feb. 19, 1985. In this device, cans at a single filing area are urged in various directions including toward a peripheral curved guide barrier by air injected through apertures in spaced plates with further apertures being provided to urge cans along the guide barrier through the single lining area. The device and method of this invention facilitates single filing apparatus such as disclosed in U.S. Pat. No. 4,500,229.

SUMMARY OF THE INVENTION

This invention provides apparatus and method for facilitating formation of moving cylindrical articles into single file utilizing diverting arms having an article engagable portion at the single filing area for engaging articles then not in single file and yieldably urging such articles toward a single file arrangement.

A plurality of diverting arms are preferably utilized with the arms being spaced from one another and pivotably mounted on a mounting plate so that the article engaging portions of the arms are successively engagable with articles not then in single file adjacent to a guide member to yieldably urge such articles toward the guide member as such articles are conveyed through the single lining area. The arms extend from the mounting plate so as to be positioned at an angle with respect to the guide member and the mounting plate has apertures therein so that air expelled therethrough urges articles between the diverting arms toward the guide member.

The articles being conveyed are preferably moved through the single filing area at a high flow rate of, for example, about 2000 articles/minute, and are preferably moved at such speeds between a pair of vertically spaced plates having apertures formed therein so that air expelled through the apertures urges articles not then in single file toward the guide member, with the plates also having apertures formed therein so that air expelled through the apertures urges articles then in single file adjacent to guide members through the conveying area in a direction parallel to the guide member.

It is therefore an object of this invention to provide improved apparatus and method for urging cylindrical articles into a single file arrangement.

It is another object of this invention to provide an apparatus and method for facilitating formation of moving cylindrical articles into single file utilizing yieldable diverting means.

It is still another object of this invention to provide a method and apparatus for facilitating formation of moving cylindrical articles into single file utilizing a plurality of article engagable means positioned at a single filing area.

It is still another object of this invention to provide an apparatus and method for facilitating movement of cylindrical articles into single file utilizing a combination of yieldable diverting arms and air directed toward the articles.

It is still another object of this invention to provide an improved apparatus and method for facilitating movement of cylindrical articles into single file at a high flow rate.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is a perspective view of apparatus according to this invention;

FIG. 2 is a planar view of the upper plate of the apparatus shown in FIG. 1 and illustrating arrangement of the apertures therein (with the apertures extending throughout the plate although the apertures are shown only in part in FIG. 2);

FIG. 3 is a top view of the apparatus of FIG. 1 with the top plate removed and particularly illustrating arrangement of the diverting arms;

FIG. 4 is a side view of the mounting plate best shown in FIG. 3 and particularly illustrating the mounting for the diverting arms and apertures therebetween;

FIG. 5 is a partial perspective view illustrating mounting of the diverting means on the mounting plate;

FIG. 6 is a perspective view illustrating the most downstream mounted diverting arm shown adjacent to a modified telescopically mounted post of a single file receiving conveyor; and FIG. 7 is a top view similar to that of FIG. 3 but showing ejection of cylindrical articles not brought into single file while at the single lining area.

DESCRIPTION OF THE INVENTION

As best shown in FIGS. 1, 3 and 7, apparatus 12 is used to move, and single file, articles, such as cylindrical articles 14 and preferably thin walled cans, which articles are carried to apparatus 12 in bulk on conventional delivery means (such as a conveyor belt as shown in U.S. Pat. No. 4,500,229, but may also be in the form of an air transport, swept plate, or the like from various sources, including can forming machinery or pallets of articles). The delivery means terminates immediately adjacent apparatus 12, and, more particularly, adjacent to upper plenum 16 and lower plenum 17, each of which communicates to the area therebetween through facing plate members 19 (at each plenum) having apertures, or holes, 20 therethrough formed so that fluid, usually air, expelled therethrough, is directed at a predetermined angle with the pattern of apertures being preferably identical (i.e., in mirror image fashion) in each facing plate.

As illustrated in FIG. 2, angled apertures 20 include two groups of apertures (designated as apertures 20' and 20") with the apertures of each group being substantially identically angled with respect to one another and the apertures of each group being oriented in different directions with respect to the apertures of the other group as indicated by the pointers illustrating flow direction for each group of apertures. Upper pneumatic inlet 22 (with control valves 23) and lower pneumatic inlet 24 (with control valves similar to control valves 23) provide fluid (usually air) under pressure to upper plenum 16 and lower plenum 17, respectively, as indicated in FIG. 1, to thereby cause fluid to be expelled through apertures 20. As indicated, upper and lower plenums 16 and 17 may also have a baffle 25 therein to provide separate air flows to the groups of apertures provided at faces 19. In this manner, first and second directed air flows are provided through plate members 19 to urge mass conveyed articles 14 into a desired single file arrangement and to urge single filed articles through single filing area 26.

Plate members 19 are spaced a distance somewhat greater (and at least a distance slightly greater) than the height of articles 14, but less than the diagonal dimension of articles 14 so that articles 14 are free to move between the plates, but are confined by plate members 19 to prevent tipping.

Guide member 28 (which is preferably formed by spaced upper and lower guides, or rods) is arranged along one edge of single filing area 26 (i.e., along one periphery of plate members 19) to establish a single filing section, or zone 30, adjacent to the guide member so that articles then in single file at the single filing zone are conveyed through the single filing area in a direction parallel to the guide member.

Accordingly, articles 14 moving through single filing area 26 in the single lined zone 30 adjacent to the guide member, are delivered from the single filing area to single file conveyor 34, while articles not then in single file are ejected, as brought out hereinafter.

Thus, as will be appreciated from the foregoing, articles 14 are presented between parallel spaced plate members 19 having angled holes 20 defined therethrough and oriented in such a fashion as to tend to urge articles 14 toward contact with guide member 28 for formation and conveying through the single filing area between plate members 19 in a single file fashion, in the general manner as shown in U.S. Pat. No. 4,500,229, which patent is hereby included by reference herein.

Single file conveyor 34, which may be of conventional construction and may be a conveyor belt, confined guide members operating under air pressure, gravity, or the like, receive single filed articles 14 for transport as desired. As shown in FIGS. 1, 3, 6 and 7, single file conveyor 34 preferably includes a retractable arm 36 having a roller 38 mounted thereon (except arm 36' in FIG. 6 has been modified to have no roller thereon) to facilitate ejection of articles not in single file when reaching the single file conveyor. As shown, arm 36 has rearwardly extending rods, or feet, 40 which are receivable into recesses in mounting structure 42 of conveyor 34 (as indicated in FIG. 6). Arm 36 is biased in the direction opposing article movement toward single file conveyor 34 (which biasing can be effected by springs, for example) and a stop (such as by lever 39 as indicated in FIG. 6) can be provided to prevent arm 36 from movement in the direction opposite to article movement beyond a predetermined distance. By this arrangement, arm 36 is yieldable rearwardly (i.e., in the same direction as article movement), as indicated in FIG. 7, due to pressures imposed on the post by moving articles engaging the post.

In this invention, articles not in single file adjacent to the guide members are brought into engagement with article diverter 46, which diverter as best shown in FIGS. 1, 3 and 7, includes a plurality of diverting arms 48 arranged along the flow path of articles passing through single filing area 26 so that articles 14 not then in single file are successively engaged by the diverting arms.

As shown in FIGS. 3, 5 and 7, each arm 48 has an outer article, or article engagable, portion 50 and an inner, or mounting, portion 52. As best shown in FIGS. 4 and 5, each mounting portion 52 of each arm 48 is pivotably mounted on support, or mounting, plate 54 of mounting support 56 by means of pins 58 and cooperating flanges 60 and 62 having pin receiving channels therein with flanges 60 and 62 being attached to mounting portion 52 and mounting plate 54, respectively.

As best shown in FIGS. 5 and 6, each arm 48 is preferably a thin rectangularly-shaped plate (formed of Plexiglas, for example) extending outwardly from support plate 54 at an angle (about 30° for example, with respect to the mounting plate) into the single filing area so that articles not then in single file adjacent to the guide member engage, or contact, the diverting arms and are urged toward the guide member. Each arm 48 has sufficient width so that opposite side edges are adjacent to plates 19 (i.e., the width of each arm is slightly less than the spacing between the plates). As shown in FIGS. 3 and 7, each arm extends outwardly and preferably terminates short of single filing zone 30 (i.e., terminates short of engaging articles then in single file adjacent to guide member 28. In addition, each arm 48 preferably has either a roller 64 or a central notch 66 at the free end thereof (rollers 64 are indicated at the more downstream arms 48, but this arrangement can be varied as needed).

As also indicated in FIG. 5, each arm 48 is biased by leaf spring 68 to oppose the flow of articles not then in single file through the single filing area, with each arm yieldably contacting articles not then in single file so that the arms urge the articles toward contact therewith toward guide member 28 until, and unless, the bias imposed on the spring is overcome, at which time the arm is moved, or deflated, to allow the articles to pass to the next downstream positioned arm, as indicated in FIG. 7. A stop 70 is also provided on each arm 48 to prevent pivotal movement of the arm beyond a specific movement in the direction imposed by spring 68.

As indicated in FIGS. 3 and 7, mounting support 56 is preferably positioned at single filing area 26 so that mounting plate 54 is angled with respect to guide member 28 (although, for some applications, plate 54 could be parallel to the guide member). In addition, mounting support 56 also has a plenum 72 formed therein by support plate 54, sidewall 74, top and bottom walls 76 and 78, and end walls 80, with plenum 72 having inlet 82 with fluid control valves 83 therein (as indicated in FIG. 1, baffles 84 are provided to divide the plenum into separate chambers).

Support plate 54 has apertures 86 therein between each arm 48 and the apertures (which preferably could include a tube 87 mounted therein, if desired) are angled to expel fluid (normally air) in a direction parallel to the parallel extending arms 48 to facilitate urging of articles at an angle toward guide member 28. As indicated in FIG. 3, arms 48 are preferably normally maintained parallel to one another, and fluid is preferably expelled through tubes 87 in a direction parallel to the arms, which direction of fluid is also preferably parallel to the direction of flow of fluid expelled through apertures 20' of plates 19 (i.e., those apertures angled to urge articles toward guide member 28). If needed, a diverting plate (not shown) can be utilized at the front edge of mounting support 56 to deflect articles outwardly of the mounting support.

In a working embodiment of this invention, it has been found that cylindrical articles (and, more specifically cans) can be effectively brought into single file utilizing this invention at a high flow rate of articles, which flow rate can be, for example, about 2000 cans per minute.

As shown, the free end of the last downstream mounted arm 48 (designated as arm 48' in FIG. 6) to be engaged by articles not then in single file, is adjacent to single filing receiving conveyor 34, and, more particularly, is adjacent to retractable arm 36 thereof, so that arm 48' cooperates with arm 36 and conveyed articles thereat to cause ejection of articles not then in single file. As indicated in FIG. 7, when this occurs, articles not then in single file cannot pass to single lining conveyor 34, but instead, are ejected or otherwise diverted (and can be dropped or otherwise conveyed away from the single filing area).

As also shown in FIG. 6, arm 48' has a central aperture 88 therein, and baffle, or closing device, 89 is mounted on the rear face (i.e., the face at the side opposite to the face engagable with articles moving through the single filer) of arm 48', with baffle 89 being mounted thereon by means of hinge 90 so that baffle 89 normally covers aperture 88 in arm 48', due to gravity, when arm 48' is in the resting state. However, when pressure builds at the side of arm 48' opposite to that having baffle 89 mounted thereon, the baffle will be pivoted to allow excess pressure to be vented through aperture 88.

In view of the many possible parameters, such as, for example, variations in article sizes, conveyor rates, aperture patterns and sizings, and working air pressures, it will be recognized that no one configuration of diverting arms or bias to be applied to each arm will be optimum, and the number and/or configuration of diverting arms 48 to be utilized can be varied as needed for any particular arrangement, as can the bias to be imposed by the spring on each arm, without departing from the intended scope of this invention.

It should be appreciated that this invention provides an improved apparatus and method for causing single filing of cylindrical articles, and, more particularly, for facilitating formation of such articles into single file.

What is claimed is:

1. An apparatus for facilitating formation of moving articles into single file, said apparatus comprising:
   conveying means, including first and second vertically spaced surfaces, for causing movement of a plurality of articles in at least one predetermined direction through a single filing area between said spaced surfaces;
   mounting means; and
   article diverting means at said single filing area, said article diverting means including at least one elongated arm having an article engaging portion and a mounting portion, said article engaging portion having a width slightly less than the spacing between said first and second spaced surfaces with said mounting portion being mounted on said mounting means so that at least said article engaging portion is movable with respect to said mounting means in said one predetermined direction whereby said article diverting means yieldably urges articles engaged by said article engaging means toward a single file moving in said predetermined direction.

2. The apparatus of claim 1 wherein said conveying means includes fluid supply means, and wherein said first and second spaced surfaces are provided by plates positioned to be engagable with said articles at opposite sides thereof, at least one of said plates having first and second groups of apertures therein through which fluid is expelled from said fluid supply means, with said first group of apertures being substantially aligned with respect to one another so that said fluid expelled therethrough causes movement of said articles in said predetermined direction and with said second group of apertures being substantially aligned with respect to one another so that fluid expelled therethrough causes said articles not then in single to be moved toward articles then in single file.

3. The apparatus of claim 1 wherein said mounting means includes a mounting plate within said single filing area, and wherein said mounting portion of said article directing means is pivotably mounted on said mounting plate.

4. The apparatus of claim 1 wherein said apparatus includes biasing means to cause said article engaging portion of said article diverting means to yieldably resist movement of articles in said one predetermined direction.

5. The apparatus of claim 1 wherein said at least one arm of said article diverting means has said mounting portion at one end of said arm and said article engaging portion outwardly of said mounting portion, said arm being mounted such that said article engaging portion thereof engages articles not then in single file but does not engage articles then in single file.

6. The apparatus of claim 1 wherein said arm has a roller mounted on said article engaging portion.

7. The apparatus of claim 1 wherein said article diverting means includes a plurality of arms spaced from one another in said single filing area with each of said arms having a portion establishing an article engaging portion with said portion being successively engagable with said articles not then in single file as said articles move along through said single filing area.

8. The apparatus of claim 1 wherein said device includes ejecting means allowing ejection of articles not brought into single file while moving through said single lining area of said apparatus.

9. The apparatus of claim 1 wherein said conveying means causes movement of said articles at a high flow rate including a flow rate of about 2000 articles per minute.

10. An apparatus for facilitating formation of moving articles into single file, said apparatus comprising:
conveying means, including first and second vertically spaced surfaces, for causing movement of a plurality of articles in at least one predetermined direction through a single filing area between said spaced surfaces;
mounting means; and
article diverting means at said single filing area, said article diverting means including at least one elongated arm having an article engaging portion and a mounting portion, said article engaging portion having a width that extends a substantial distance of at least one-fourth of the distance between said spaced surfaces with said arm having a notch formed on said article engaging portion, and with said mounting portion being mounted on said mounting means so that at least said article engaging portion is movable with respect to said mounting means in said one predetermined direction whereby said article diverting means yieldably urges articles engaged by said article engaging means toward a single file moving in said predetermined direction.

11. An apparatus for facilitating formation of moving articles into single file, said apparatus comprising:
conveying means, including first and second vertically spaced surfaces, for causing movement of a plurality of articles in at least one predetermined direction through a single filing area between said spaced surfaces;
mounting means; and
article diverting means at said single filing area, said article diverting means including at least one elongated arm having an article engaging portion and a mounting portion, said article engaging portion having a width that extends a substantial distance of at least one-fourth of the distance between said spaced surfaces, said arm having an aperture in said article engaging portion thereof, and said arm also having closure means normally covering said aperture, with said closure means being movable to release pressure through said aperture, and with said mounting portion being mounted on said mounting means so that at least said article engaging portion is movable with respect to said mounting means in said one predetermined direction whereby said article diverting means yieldably urges articles engaged by said article engaging means toward a single file moving in said predetermined direction.

12. An apparatus for facilitating formation of moving articles into single file, said apparatus comprising:
conveying means for causing movement of a plurality of articles in at least one predetermined direction through a single filing area;
mounting means;
article diverting means at said single filing area, said article diverting means having an article engaging portion and a mounting portion, said mounting portion being mounted on said mounting means so that at least said article engaging portion is movable with respect to said mounting means in said one predetermined direction whereby said article diverting means yieldably urges articles engaged by said article engaging means toward a single file moving in said predetermined direction; and
ejecting means allowing ejection of articles not brought into single file while moving through said single lining area, said ejecting means including yieldable means engagable by articles not in single file after engagement with said article diverting means to thereby divert said articles not then in single file.

13. An apparatus for facilitating formation of moving cylindrical articles into single file, said apparatus comprising:
fluid conveying means including a pair of vertically spaced plates establishing a single filing area therebetween with at least one of said plates having apertures therein through which fluid is introduced into said single filing area for urging movement of a plurality of cylindrical articles in directions having at least a component of movement in one predetermined direction through said single filing area one portion of which has said articles moving therethrough substantially in a single line in said one predetermined direction;
mounting means;
arm means including a plurality of elongated arms having an article engagable portion at said single filing area, each of said arms having a width greater than one-half of the distance between said plates but less than the distance between said plates, and each of said arms also having a mounting portion for pivotably mounting said arms on said mounting means with said arms extending from said mounting means at an acute angle with respect to said one predetermined direction of movement of said articles and with said arms extending substantially parallel to one another in said single filing area so that said article engaging portion can be pivoted by said articles urged to movement by said conveying means and so that the article engaging portions of said arms successively engage articles moving through said single filing area that are not then in single file at said single filing area;
said mounting means having apertures therein between at least two adjacent ones of said mounting portions of said arms for directing fluid therethrough into said single filing area; and
biasing means for biasing said arms against pivoted movement imposed by said articles urged to movement by said conveying means whereby articles engaged by said article engaging portion of said arms are yieldably urged toward said single file portion of said single filing area.

14. The apparatus of claim 13 wherein at least a portion of said arms includes a roller mounted on the free end thereof.

15. An apparatus for facilitating formation of moving cylindrical articles into single file, said apparatus comprising:
conveying means for urging movement of a plurality of cylindrical articles in directions having at least a component of movement in one predetermined direction through a single filing area one portion of which has said articles moving therethrough substantially in a single line in said one predetermined direction;

moutnign means;

arm means including a plurality of elongated arms having an article engagable portion at said single filing area, each of said arms having a mounting portion for pivotably mounting said arms on said mounting means so that said article engaging portions can be pivoted by said articles urged to movement by said conveying means, and each of said arms extending substantially parallel to one another in said single filing area so that the article engaging portions of said arms successively engage articles moving through said single filing area that are not then in single file at said single filing area, with at least one of said arms having an aperture in said article engaging portion thereof, and with said arm having said aperture therein having closure means covering said aperture, said closure means being movable to allow pressure to be released through said aperture; and biasing means for biasing said arm means against pivoted movement imposed by said articles urged to movement by said conveying means whereby articles engaged by said article engaging portion of said arm means yieldably urged toward said single file portion of said single filing area.

16. An apparatus for facilitating formation of moving cylindrical articles into single file, said apparatus comprising:

conveying means for urging movement of a plurality of cylindrical articles in directions having at least a component of movement in one predetermined direction through a single filing area one portion of which has said article moving therethrough substantially in a single line in said one predetermined direction;

mounting means;

arm means including a plurality of elongated arms having an article engagable portion at said single filing area, each of said arms having a mounting portion for pivotably mounting said arms on said mounting means so that said articles engaging portions can be pivoted by said articles urged to movement by said conveying means, and each of said arms extending substantially parallel to one another in said single filing area so that the article engaging portions of said arms successively engage articles moving through said single filing area that are not then in single file at said single filing area;

biasing means for biasing said arm means against pivoted movement imposed by said articles urged to movement by said conveying means whereby articles engaged by said article engaging portion of said arm means are yieldably urged toward said single file portion of said single filing area; and receiving means for receiving articles in single file from said single filing area with said receiving means including yieldable means engagable with articles not in single file during engagement with the last of said arms engagable with articles not then in single file to thereby facilitate ejection of said articles.

17. An apparatus for facilitating formation of moving articles into single file, said apparatus comprising:

fluid conveying means including a pair of spaced plates establishing a single filing area therebetween with at least one of said plates having apertures therein, fluid supply means for causing fluid to be expelled through said apertures to cause movement of said articles through said single filing area in directions having at least a component causing movement in one predetermined direction, and guide means adjacent to at least one edge of said plates with said guide means establishing an article single lined section in said single filing area through which said articles move through said single filing area in said one predetermined direction;

mounting means;

a plurality of arms mounted on said mounting means with said arms being spaced from one another and having a width less than that of the distance between said plates, said arms extending outwardly from said mounting means into said single filing area at an acute angle with respect to the direction of movement of said articles in said one predetermined direction and terminating short of said single lined section; and biasing means for causing biasing of each of said arms in a direction having a component opposite of that of said one predetermined direction of movement of said articles whereby said arms are engagable with said articles not then in said single lined section to yieldably urge said articles toward said single line section.

18. The apparatus of claim 17 wherein said apparatus includes receiving means for receiving articles in single file from said single lined section after said articles have moved through said single filing area, and wherein said arm adjacent to said receiving means cooperates with said receiving means to eject articles not in single file when reaching said receiving means.

19. The apparatus of claim 18 wherein said arm adjacent to said receiving means has an aperture therein spaced from said mounting means, and wherein said arm has a baffle hinged thereon at the side of said arm opposite to that engagable with said articles so that said baffle can be moved from a position covering said aperture to a position allowing pressure to be released through said aperture.

20. The apparatus of claim 18 wherein said receiving means includes yieldable means engagable with articles not then in single file when reaching said receiving means, and wherein the last of said arms engagable with said articles not then in single file is pivoted by contact with said articles to cooperate with said yieldable means of said receiving means for ejecting said articles.

21. The apparatus of claim 17 wherein said arms are spaced from and extend substantially parallel to one another.

22. The apparatus of claim 21 wherein said mounting means has apertures therein between said mounting portions of said arms, and wherein fluid is supplied through said apertures to facilitate urging of said articles into single file adjacent to said guide means.

23. The apparatus of claim 22 wherein a portion of said apertures in said at least one of said plates directs fluid therethrough in a direction to cause movement of articles toward said single lined section, and wherein fluid expelled through said mounting means is directed substantially in the same direction as said fluid expelled through said portion of said apertures.

24. A method for facilitating formation of moving articles into a single file, said method comprising:

causing movement of a plurality of articles in at least one predetermined direction within a single filing area determined by vertically spaced surfaces; and providing a plurality of yieldable arms within said single filing area with said yieldable arms having an article engaging portion with a width slightly less than the spacing between said spaced surfaces, and with said yieldable arms being positioned so that said article engaging portions of said arms successively engage articles not then in single file to urge said articles into single file.

25. The method of claim 24 wherein said method includes providing a single lined path for movement of said articles therein in single file in said predetermined direction, applying fluid to articles in said single lined path to cause said articles to be moved in said one predetermined direction, and applying fluid to said articles not in said single line path to cause movement of said articles toward said single lined path to thereby cause movement of said articles toward said single lined path.

26. The method of claim 24 wherein said method includes biasing said arms in a direction having a component substantially opposite to that of said one predetermined direction of movement of said articles.

27. The method of claim 24 wherein said method includes ejecting articles not brought into single file by said plurality of yieldable arms.

28. The method of claim 24 wherein said method includes moving articles at a high flow rate including a flow rate of about 2000 articles per minute.

* * * * *